Patented July 14, 1953

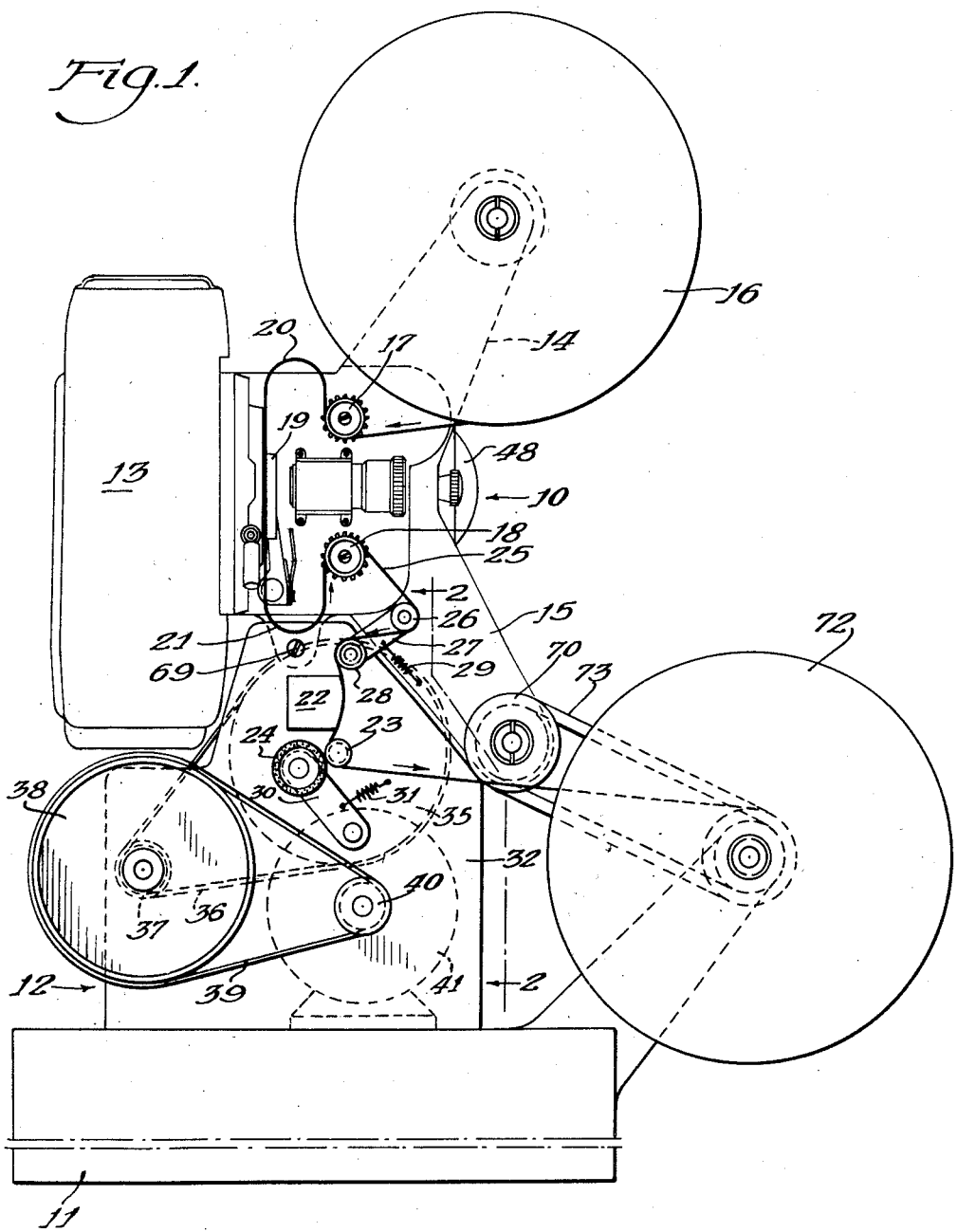

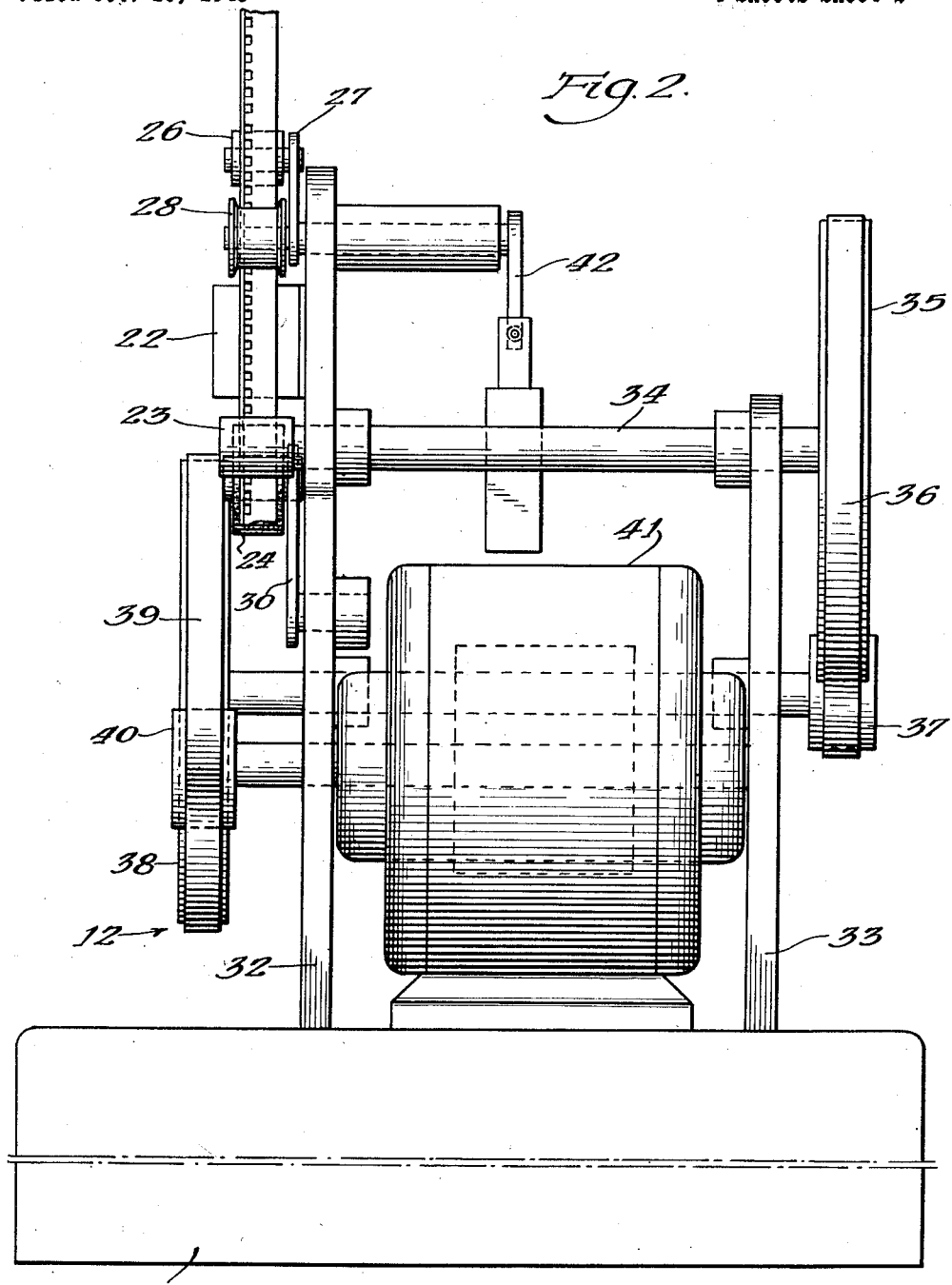

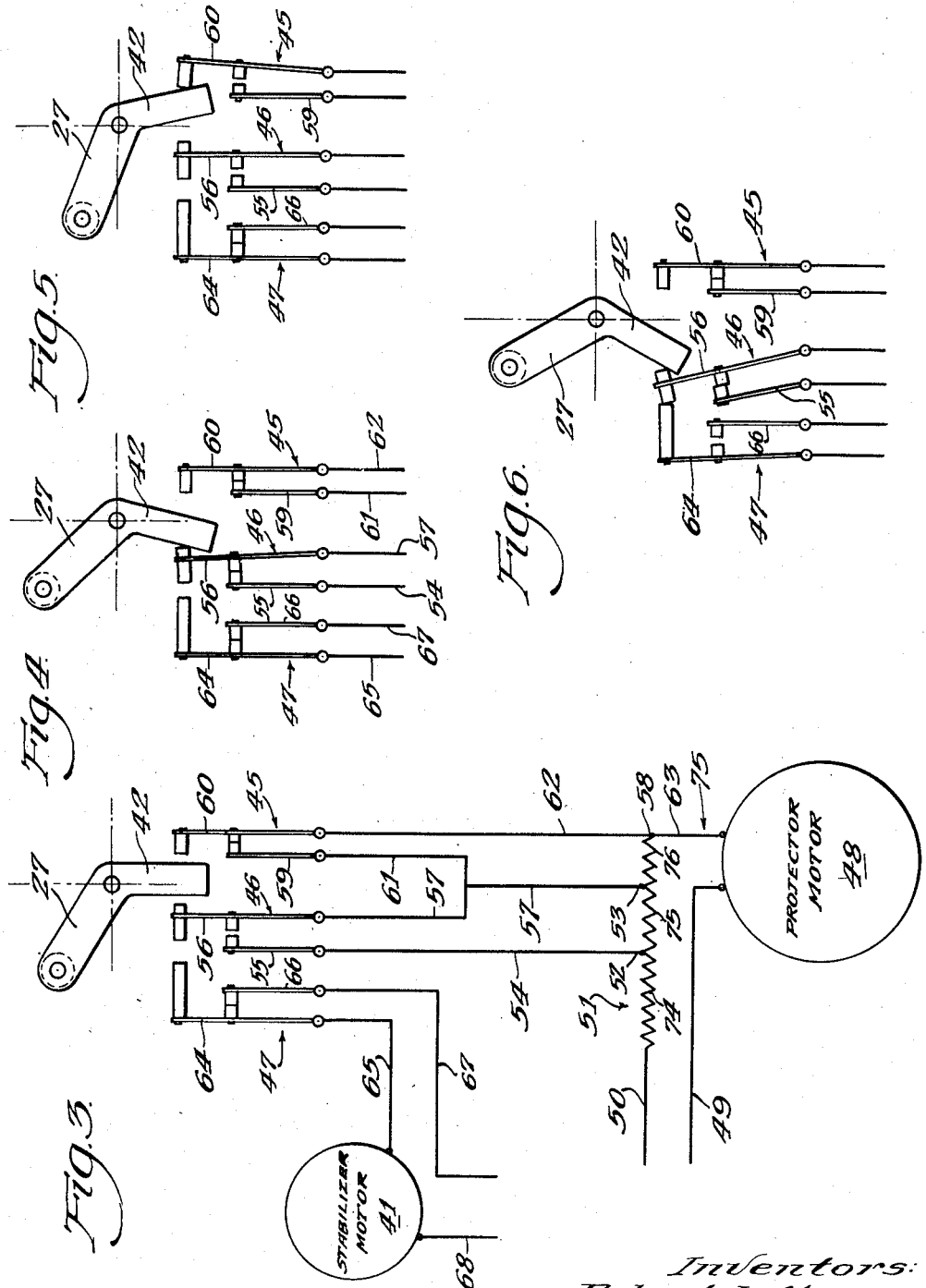

2,645,478

UNITED STATES PATENT OFFICE 2,645,478

FILM DRIVING MEANS IN SOUND PROJECTORS

Robert L. Moore and Sheldon Lee Pastor, Chicago, Ill., assignors to Revere Camera Company, Chicago, Ill., a corporation of Delaware Application October 15, 1948, Serial No. 54,704

2 Claims. (Cl. 271—2.3)

This invention relates to a sound projector for moving picture film carrying a sound track and to a method and means of stabilizing the film.

As is well known, the moving picture film is advanced past the projecting light beam with an intermittent motion, but it must be advanced past the sound head with a steady, continuous motion in order to achieve the desired results. Heretofore, the continuous motion has been obtained by providing what is known as a stabilizer, this being in the nature of a fly wheel which is driven by the film, to insure that the motion of the film will be steady and continuous. Any variation in the speed of the film, no matter how minute, will be evidenced by noises or howls in the sound system.

Various types of stabilizers have been designed which operate satisfactorily, but the primary efforts in this direction have been to design a stabilizer for use in connection with a 35 mm. film, which moves at a speed of about 14.4 inches per second. With the introduction of sound projectors for 16 mm. film, it has been found that the general type of stabilizer in conjunction with 35 mm. film has been generally satisfactory, even though the film advances only at a speed of about 7.2 inches per second. However, it has been found that the usual type of stabilizer will not operate satisfactorily in a sound projector designed for 8 mm. film for the reason that the film travels so slowly that the inertia of the fly wheel is not sufficient to provide the desired stabilizing effect, especially if it is desired to use a fly wheel of moderate size.

It is an object of our invention to provide an improved method and means for stabilizing the film speed in a sound projector which is operative at much lower linear speeds than stabilizers of the prior art.

We have found that the desired stabilizing effect can be obtained at slow speeds by having the stabilizer drive the film, rather than by having the film drive the stabilizer.

In this connection, we have provided a stabilizer which consists of a relatively constant speed film driving means which is separated from the film driving means of the optical projector by a film loop so that any irregularities in the motion of the film through the optical projector, such as that known as sprocket modulation, will not affect the stabilizer.

It is another object of our invention to provide an improved means for stabilizing the speed of a film carrying a sound track in combination with means for synchronizing the speed of the projector with respect to the stabilizer speed.

Although our invention contemplates the use of any suitable means for effecting such synchronization, such as the use of a common drive for the two separate film driving means provided for the optical projector and the sound apparatus, respectively, or the use of synchronous motors for each, in the preferred embodiment of our invention shown and described herein we have effected synchronization by regulating the speed of the former so as to conform to the speed of the latter. Thus, we are enabled to compensate for the effect of film shrinkage, as well as to use the sound apparatus embodying our improved stabilizer means in combination with any standard optical projector without the necessity of using a special motor or otherwise modifying the drive means thereof.

In this connection it can be pointed out that the film driving means of the optical projector consists of a sprocket engaging perforations in the film with the result that the linear speed of the film is a function of the distance between the film perforations. Thus, the linear speed is affected by film shrinkage, whereas such is not the case with respect to the film driving means provided for the sound apparatus, which is not a sprocket wheel. Thus, even though the peripheral speed of the two film advancing means are the same, there may be a difference between the linear speed of the film at these two different points.

It is a still further object to provide an improved sound reproducing means for use in conjunction with a moving picture film optical projector, and in particular, a sound reproducing device which can be manufactured and sold as an attachment for a standard optical projector.

Other objects, features and advantages of this invention will become apparent as the description proceeds.

With reference now to the drawings in which like reference numerals designate like parts;

Fig. 1 is an elevation of a preferred embodiment of our invention;

Fig. 2 is an end view of a portion thereof on an enlarged scale, taken along line 2—2 of Fig. 1;

Fig. 3 is a circuit diagram which also shows the switches and switch control arm as viewed from the rear;

Figs. 4, 5 and 6 are views similar to Fig. 3 but showing the switches and switch control arm in changed positions.

Figure 7:
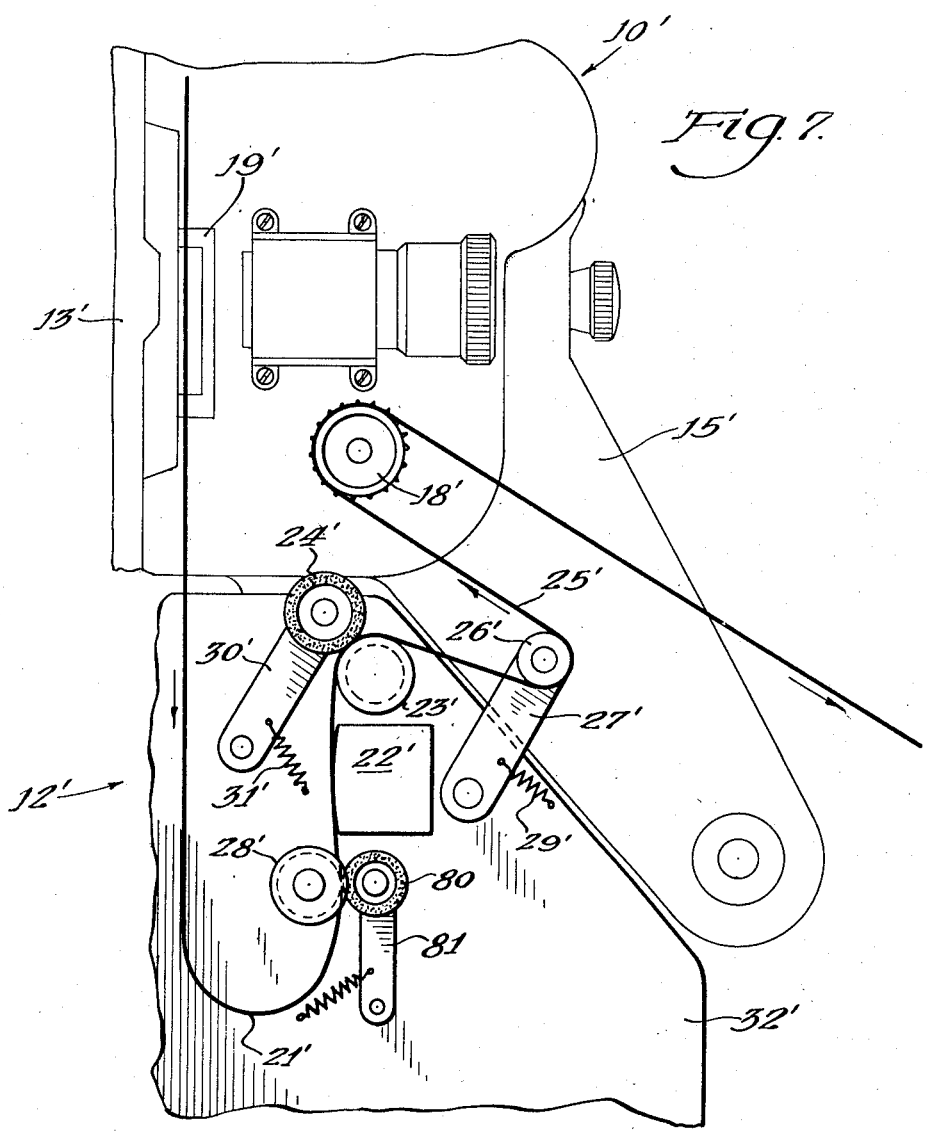
Fig. 7 is a diagrammatic representation of a modified form of our invention.

The reference numeral 10 designates generally a standard type of optical projector mounted on a special base 11 by means of the usual swivel connection 69. The base includes the sound apparatus, generally designated by the reference numeral 12. The projector includes the usual means for projecting a light beam which means is generally designated by the reference numeral 13; also arms 14 and 15. The arm 14 supports a supply reel 16, and the arm 15 is adapted to support a take-up reel, which has been removed in this instance, and a pulley 70 substituted therefor.

Suitable means are provided for driving the supply reel 16 and the pulley 70, and means are provided for intermittently advancing the film through the film gate 19 and across the light beam. Also provided are a supply sprocket 17 and a take-up sprocket 18 which are driven continuously, and which cooperate with the film gate to provide a film path which includes a slack loop 20 and a slack loop 21. All of the foregoing are elements usually found in any standard projector.

Conveniently disposed, for instance at a point beneath the take-up sprocket 18, is a sound head 22 across which film is caused to advance. The sound head may be of the photoelectric type or of the magnetic type depending upon whether the film has an optical sound track or a magnetic sound track. A stabilizer wheel 23 is disposed below the sound head and suitable means, such as a pressure roller 24, may be provided to bear against the film to avoid slipping of the film with respect to the stabilizer wheel.

The pressure roller is preferably of greater width than the film and the surface thereof is either of sufficient resilience or is relieved so that the marginal portions of the roller surface are in contact with the stabilizer wheel so that the pressure roller is directly driven by the stabilizer wheel as well as by the film. Thus, the possibility of film slippage is eliminated. The pressure roller may be pivotally mounted on an arm 30 which is biased by spring 31 to urge the pressure roller into engagement with the film and the stabilizer wheel.

The stabilizer wheel is adapted to positively drive the film and constitutes means, independent of the sprockets 17 and 18, for causing the film to advance steadily and continuously across the sound head. Due to variations in linear speeds of the film at the take-up sprocket 18, and at the stabilizer wheel, an additional loop 25 is provided in the film path. This loop is defined by a pivotally mounted idler 26 and a fixed axis idler 28, the idler 26 being mounted on a bell crank lever 27 which is pivotally mounted below the lower arm 15. A spring 29 biases the bell crank lever 27 in a clockwise direction as shown in Fig. 1 in order that the loop 27 may be maintained under a comparatively low, but constant, tension. Thus, as variations occur between the peripheral speeds of the stabilizer wheel 23 and take-up sprocket 18, the loop 25 will become larger or smaller, and this change in the size of the loop will cause displacement of the bell crank lever 27.

The means for driving the stabilizer wheel 23 at a constant speed are shown in Fig. 2. Plates 32 and 33, in which bell crank lever 27 is mounted, extend upwardly from the base 11. A shaft 34 is suitably journaled in the plates and carries at one end the stabilizer wheel 23 and at the other end a fly wheel 35. Also suitably journaled in plates 32 and 33 is a double pulley 37, 38, and a constant speed motor 41 is mounted on the base 32. The motor 41 is provided with a drive pulley 40 which is connected to the larger pulley element 38 of the double pulley by a belt 39. A similar belt 36 connects the smaller pulley element 37 of the double pulley with the fly wheel 35. The belt and pulley elements above mentioned constitute speed reducing means which enable the stabilizer wheel 23 to be rotated at the desired peripheral speed, which in this instance can be taken to be 2.7 inches per second.

The motor 41 can be any motor of a type which operates at a suitable constant speed under the designed load of the aforementioned mechanism, such as a shaded pole motor, the speed of which is determined by the alternating current of the power line.

The projector is provided with a motor 48 which may be of any desired type. The usual projector is provided with a universal motor with the result that the speed of the motor and consequently the speed of the take-up sprocket 18 and all of the other film driving means, will vary with the line voltage and with the load on the motor. This variation in the speed of the projector motor will cause one part of the film to be advanced at a different rate of speed from another part of the film, thereby causing a change in the size of the loop 25, and a resultant displacement of the bell crank lever 27 as pointed out above.

This displacement of the bell crank lever 27 is utilized to regulate the speed of the projector motor so that the advance of the film through the projector can be synchronized with its advance across the sound head 22.

One arm of the bell crank lever constitutes a switch actuating arm 42, the arm 42 being adapted to alternatively engage either a normally closed low speed switch 45 or a normally open high speed switch 46. A normally closed safety switch 47 is also provided which is actuated indirectly by the arm 42, as pointed out hereinafter.

The projector motor is energized by line wires 49 and 50, the line wire 49 being connected directly to the motor 48 and the line wire 50 being connected to the motor through resistor 51 provided with taps 52 and 53 which divide resistor 51 into portions 74, 75, 76. Tap 52 is connected by a lead 54 to a normally stationary contact 55 which forms a part of the high speed switch 46. The latter switch also includes a movable contact 56 which is connected by lead 57 to tap 53. The low speed switch 45 comprises a stationary contact 59 and a movable contact 60, the former being connected to tap 52 by leads 61 and 57 and the latter being connected to the end 58 of said resistor by a lead 62. A lead 63 connects the lead 62 and the end 58 to the motor 48.

In normal running operation, the bell crank lever 27 can assume either one of three positions which are shown in Figs. 3, 4 and 5 respectively. In the Fig. 3 position, the arm 42 is midway between the movable contacts 56 and 60. If at this time the speed of the projector is exactly synchronized with the speed of the stabilizer wheel, the arm 42 will remain in this position indefinitely. In this position of the parts, the low speed switch 45 is closed, thereby shunting out the resistor portion 76 and the high speed switch 46 is open, thereby placing the portions 74 and 75 in series with the motor. If the projector speed should drop, due to a drop in line voltage or due to other causes, then the loop 25 will become smaller, thereby rotating the bell crank lever 27 in counterclockwise direction (as viewed in Fig. 1) and into the Fig. 4 position. In this position the arm 42 engages the movable contact 56 of the high speed switch, thereby shunting out resistor portion 75 and causing the projector motor to speed up.

After a period of operation at this higher speed, the loop 25 will tend to become enlarged, thereby causing rotation of the bell crank lever in a clockwise position back to its Fig. 3 position. If the same voltage conditions exist, the bell crank lever will oscillate or float between the Fig. 3 and Fig. 4 positions with the result that the average speed of the film through the projector will be the same as the speed of the film across the sound head. If, on the other hand, the line voltage should increase, the loop 25 will become larger causing rotation of the bell crank lever 27 in the clockwise direction (as viewed in Fig. 1), and into the Fig. 5 position. In this position, the arm 42 will engage the movable contact 60 of the low speed switch and cause the shunt circuit around resistor portion 76 to be opened, thereby throwing additional resistance in series with the motor and causing the motor to slow down. After a period of operation at this slower speed, the bell crank lever will tend to move back to its Fig. 3 position. If these high voltage conditions prevail, the bell crank lever will oscillate between its Fig. 3 and Fig. 5 positions to provide effective synchronization of the projector motor and the stabilizer motor. It will be understood that under certain conditions the bell crank lever may oscillate between the Fig. 4 and Fig. 5 positions without reversing itself when it reaches the Fig. 3 position.

The safety switch 47 is provided to automatically shut off the stabilizer motor 41 in the event that the film driving mechanism of the optical projector becomes inoperative for any reason. This will contract the loop 25 very rapidly, thereby causing the arm 42 to be displaced into the Fig. 6 position in which both contacts 55 and 56 are flexed and the latter engages a movable contact 64 which forms a part of the safety switch 47. The movable contact 64 is connected to the stabilizer motor 41 by means of a lead 65 and a stationary contact 66 is connected to one of a pair of line wires 67, 68. The other line wire 68 is connected to stabilizer motor 41. Thus, the circuit to the stabilizer motor 41 is broken by the displacement of the movable contact 64. As soon as conditions are rectified, the loop 25 may be enlarged by the operator to the extent wherein the arm 43 is out of contact with the movable contact 64, thereby restoring the stabilizer motor circuit to its normal operating condition, pulley 70 being part of the projector 10.

A take-up reel 72 can be mounted on the base 11 in any suitable manner, and be driven from pulley 70 by means of a belt 73.

The operation of several groups of elements has been described in connection with the description of those elements. It will be seen that stabilization is accomplished by positively driving the film across the sound head at a steady, continuous rate of speed. Heretofore stabilization has been accomplished by having the film drive the stabilizer fly wheel, but this method has not been successful at low speeds, due either to insufficient momentum of the fly wheel with respect to the sprocket modulation of the film or due to insufficient friction between the stabilizer wheel and the film at low speeds, or due to a combination of both of these and possibly other factors. However, by positively driving the film, it has been found that the desired stabilization can be obtained both at the low speeds encountered with 8 mm. equipment (2.7 inches per second at 18 frames per second) and at the higher speeds involved with 16mm. and 35 mm. equipment (7.2 and 14.4 inches per second, respectively, at 24 frames per second).

In the present arrangement, the moments of inertia and velocity of all the rotating parts of the system, including the motor armature, contribute to the stabilizing effect. Thus, the low speed fly wheel 35 could be eliminated where the other parts of the system are designed to provide the desired momentum. Furthermore, by having the stabilizer drive the film independently of the sprocket, there is no problem of film tearing by the sprocket during acceleration as there is when the stabilizer is driven by the sprocket through the film. Thus, the limitations placed on the total momentum of the system by the prior art constructions are avoided.

Other means of obtaining synchronization can be employed. For instance, instead of using only one high speed switch and one low speed switch, a series of two or more of each may be used to provide quicker action in bringing the bell crank lever back to its intermediate position. In the alternative, a variable resistor could be employed providing for an infinite number of speeds, thereby obtaining more uniform motor speed.

The difficulty in obtaining proper synchronization is due largely to varying line voltage and varying loads on the projector motor. However, instead of the usual universal motor, a projector could be provided with a constant speed motor of the same type as the stabilizer motor; or in the alternative, a single motor could be provided having a common drive for both the stabilizer and projector mechanism. In the latter event, the compensation effected by the bell crank lever 27 could be eliminated, or some mechanical speed control could be substituted therefor in the event that compensation is still found to be necessary. Motion picture film, especially when old, is subject to shrinkage to a greater or less extent. For reels up to 50 or 100 feet in length, the necessary compensation could be obtained merely by providing a loop, similar to loop 25, of sufficient length to accommodate the effective speed reduction of the projector mechanism which would be occasioned by normal shrinkage. For larger reels, however, and in order to take care of all possible speed variations, it has been found advisable to employ compensating means such as that herein exemplified by the bell crank lever and the motor speed control means.

It will be observed that all parts, not common to the usual optical projector, are mounted on base 11, with the result that any optical projector can be converted to a sound projector merely by removing it from its base and mounting it on base 11 by means of the standard swivel mounting 69. The necessary electrical connection between the two can be effected by providing a socket in the base 11 into which the cord of the optical projector may be plugged, this point of connection being indicated by the reference numeral 75 in Fig. 3. In such an event the lines 67 and 68 and 49 and 50 may be connected to a common power source.

Thus, the sound apparatus 12 can be sold separately as an attachment for any optical projector powered by a motor the speed of which can be regulated by voltage variation. The taps 52 and 53 may be adjustable so that the regulating means can be accomodated to the individual characteristics of the projector motor.

A modified form of our invention is shown in Fig. 7 in which the positions of stabilizer wheel 23' and idler 28' are reversed. Thus the film feed is from slack loop 21' to the sound head 22' and around the stabilizer wheel 23' to the compensating loop 25'. A rubber snubber roller 80, mounted on a spring biased arm 81, cooperates with the flanged idler 28' to maintain under tension that portion of the film which is being advanced across the sound head. The other parts of the modified structure are substantially identical to the corresponding parts in Figs. 1 to 6, and are indicated by the same reference numerals primed, and need not be described again in detail.

The operation of the Fig. 7 construction is substantially the same as that of the Fig. 1 construction, except that a drop in projector speed will increase the loop size, instead of decreasing it and vice versa. Thus, the positions of the switches 45, 46 and 47 with respect to the arm 42 would be the reverse of the positions shown in Figs. 3 to 6.

It will be understood that various modifications and changes may be made without departing from the spirit and scope of our invention as defined by the appended claims.

We claim:

1. In sound apparatus in the form of an attachment adapted for use with an optical projector having a sprocket for advancing a film and means for driving said sprocket, said sound apparatus including a sound head and means providing a path for said film across said sound head, the combination of film driving means for advancing said film across said sound head at a substantially constant speed, means adapted to provide a film loop between said sprocket and said film driving means, displaceable means engaging said film loop, the position of which is controlled by the size of said film loop, and speed control means actuated by said displaceable means for regulating the speed of said sprocket driving means, said sound apparatus being in the form of a structurally independent base member, a take-up reel mounted on said base member and adapted to be driven from said optical projector, said constant speed film driving means being disposed between said sound head and said take-up reel, and said take-up reel being adapted to be driven from said projector so as to tension said film around said film driving means to increase its frictional engagement therewith, said film driving means being provided with a smooth surface free from sprockets, and supporting means mounted on said base member on which an optical projector can be mounted.

2. A sound projector comprising a sprocket for advancing a perforated film, a motor for driving said sprocket, a stationary sound head, means for guiding a film across said sound head in cooperative relationship thereto, film driving means disposed adjacent said sound head for advancing said film across said sound head at a substantially constant speed, means providing a film loop between said sprocket and said film driving means, displaceable means engaging said film loop, the position of which is controlled by the size of said film loop, speed control means actuated by said displaceable means for regulating the speed of said motor, said film driving means comprising a stabilizer wheel for engaging said film, a shaft on which said wheel is mounted, and a fly wheel mounted on said shaft and having a diameter very much greater than the diameter of said stabilizer wheel whereby the system comprising said stabilizer wheel, said shaft, and said fly wheel provides substantial inertia at comparatively low peripheral speeds of said stabilizer wheel, thereby enabling use of said sound projector with 8 mm. film, said displaceable means including a switch actuating arm, and said speed control means comprising two resistances in series circuit with each other and with said motor, a shunt circuit including a switch for each of said resistances, one of said switches constituting a normally closed low speed switch disposed adjacent said arm and adapted to be actuated by said arm to increase the resistance in series with said motor as said film loop increases in size, and the other of said switches constituting a normally open high speed switch disposed adjacent said arm and adapted to be actuated alternatively by said arm to decrease the resistance in series with said motor as said film loop decreases in size, said motor comprising a constant speed motor, and a motor circuit therefor including a normally closed safety switch in series circuit therewith, said switch being disposed adjacent said high speed switch and being adapted to be actuated into open circuit position by said switch actuating arm upon displacement of the same beyond that position which is necessary for the actuation of said high speed switch.

ROBERT L. MOORE.
SHELDON LEE PASTOR.

References Cited in the file of this patent

UNITED STATES PATENTS

| Number | Name | Date |
|---|---|---|
| 1,673,521 | Maas | June 12, 1928 |
| 2,079,223 | Murdock | May 4, 1937 |
| 2,099,987 | Murdock | Nov. 23, 1937 |
| 2,116,586 | Stoller | May 10, 1938 |
| 2,223,033 | Friemel | Nov. 26, 1940 |
| 2,243,112 | Morrissey | May 27, 1941 |

FOREIGN PATENTS

| Number | Country | Date |
|---|---|---|
| 456,884 | Great Britain | Nov. 17, 1936 |